(12) United States Patent
DeCusatis et al.

(10) Patent No.: US 6,970,649 B2
(45) Date of Patent: Nov. 29, 2005

(54) WDMA FREE SPACE BROADCAST TECHNIQUE FOR OPTICAL BACKPLANES AND INTERPLANAR COMMUNICATIONS

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/011,926

(22) Filed: Oct. 30, 2001

(65) Prior Publication Data

US 2003/0081281 A1    May 1, 2003

(51) Int. Cl.[7] .......................... H04J 14/02; H04J 14/00; H04B 10/04
(52) U.S. Cl. .......................... 398/79; 398/48; 398/187; 398/198
(58) Field of Search .................... 398/43–103; 372/20

(56) References Cited

U.S. PATENT DOCUMENTS

| | | |
|---|---|---|
| 3,777,154 A | 12/1973 | Lindsey |
| 3,943,021 A | 3/1976 | Lindsey |
| 4,588,296 A | 5/1986 | Cahill et al. |
| 4,725,120 A | 2/1988 | Parzygnat |
| 4,744,617 A | 5/1988 | Hvezda et al. |
| 4,863,332 A | 9/1989 | Wiholm et al. |
| 4,870,637 A | 9/1989 | Follett et al. |
| 4,872,739 A | 10/1989 | Kahn et al. |
| 4,890,894 A | 1/1990 | Kwa |
| 4,892,376 A | 1/1990 | Whitehouse |
| 4,895,424 A | 1/1990 | Hughes |
| 4,943,136 A | 7/1990 | Popoff |
| 4,944,568 A | 7/1990 | Danbach et al. |
| 5,009,477 A | 4/1991 | Alferness et al. |
| 5,068,864 A | 11/1991 | Javan |
| 5,071,216 A | 12/1991 | Sullivan |
| 5,101,460 A | 3/1992 | Richard |
| 5,134,508 A | 7/1992 | Corda |
| 5,144,691 A | 9/1992 | August et al. |
| 5,155,784 A | 10/1992 | Knott |
| 5,182,780 A | 1/1993 | Robertson |
| 5,204,925 A | 4/1993 | Bonanni et al. |
| 5,218,654 A | 6/1993 | Sauter |
| 5,228,105 A | 7/1993 | Glista |
| 5,240,617 A | 8/1993 | Hopf |
| 5,245,680 A | 9/1993 | Sauter |
| 5,247,593 A | 9/1993 | Lin et al. |

(Continued)

FOREIGN PATENT DOCUMENTS

EP    0 486 208 A2    5/1992

(Continued)

OTHER PUBLICATIONS

Stamatios V. Kartalopoulos, "Introduction to DWDM Technology: Data In A Rainbow", IEEE Communications, SPIE Optical Engineering Press.

(Continued)

*Primary Examiner*—M. R. Sedighian
(74) *Attorney, Agent, or Firm*—Scully, Scott, Murphy & Presser; James J. Cioffi

(57) ABSTRACT

A wavelength Division Multiple Access (WDMA) free space broadcast technique for optical backplanes and interplanar communications for providing free space optical interconnects between multiple circuit cards in a computer system or networking device which is compatible with existing electrical backplanes. Current equipment can easily be upgraded in the field to take advantage of this new approach by simply replacing existing printed circuit boards, without requiring a complete redesign of the copper backplane.

20 Claims, 6 Drawing Sheets

U.S. PATENT DOCUMENTS

| | | | |
|---|---|---|---|
| 5,259,051 A | 11/1993 | Burack et al. | |
| 5,268,981 A | 12/1993 | Shahid | |
| 5,280,551 A | 1/1994 | Bowen | |
| 5,283,851 A | 2/1994 | Vergnolle | |
| 5,340,980 A | 8/1994 | Bianchini et al. | |
| 5,367,598 A | 11/1994 | Devenish, III et al. | |
| 5,371,820 A | 12/1994 | Welbourn et al. | |
| 5,373,385 A * | 12/1994 | Darcie et al. | 398/187 |
| 5,388,174 A | 2/1995 | Roll et al. | |
| 5,402,515 A | 3/1995 | Vidacovich et al. | |
| 5,543,935 A | 8/1996 | Harrington | |
| 5,808,762 A * | 9/1998 | Vanoli et al. | 398/79 |
| 5,920,664 A * | 7/1999 | Hirabayashi et al. | 385/16 |
| 5,953,139 A * | 9/1999 | Nemecek et al. | 398/79 |
| 6,014,390 A * | 1/2000 | Joyner | 372/20 |
| 6,038,226 A * | 3/2000 | Ellersick et al. | 370/352 |
| 6,222,861 B1 | 4/2001 | Kuo et al. | |
| 6,317,247 B1 | 11/2001 | Yang et al. | |
| 6,333,941 B1 | 12/2001 | Hung | |
| 6,348,986 B1 * | 2/2002 | Doucet et al. | 398/128 |
| 6,415,074 B1 * | 7/2002 | Donald et al. | 385/24 |
| 6,462,844 B1 * | 10/2002 | Kai et al. | 398/79 |
| 6,650,844 B1 * | 11/2003 | Davies et al. | 398/164 |
| 6,661,973 B1 * | 12/2003 | Huber et al. | 398/91 |

FOREIGN PATENT DOCUMENTS

| | | |
|---|---|---|
| EP | 0 571 037 A1 | 11/1993 |
| EP | 0 840 468 A3 | 5/1998 |
| EP | 0 911 658 A1 | 4/1999 |
| JP | 07-211996 | 8/1995 |
| WO | WO 94/18587 | 8/1994 |
| WO | WO 94/18589 | 8/1994 |
| WO | WO 96/10201 | 4/1996 |
| WO | WO 99/43060 | 8/1999 |

OTHER PUBLICATIONS

John Carroll, et al., "Distributed Feedback Semiconductor Lasers", The Institute of Electrical Engineers, SPIE Optical Engineering Press, pp. 9-15.

"Other Optical Components", Chapter 9, pp. 131-137; and.

Eric D. Black, "An Introduction to Pound-Drever-Hall Laser Frequency Stabilization", LIGO Project, California Institute of Technology, LIGO-P990042-00-D, pp. 1-36.

* cited by examiner

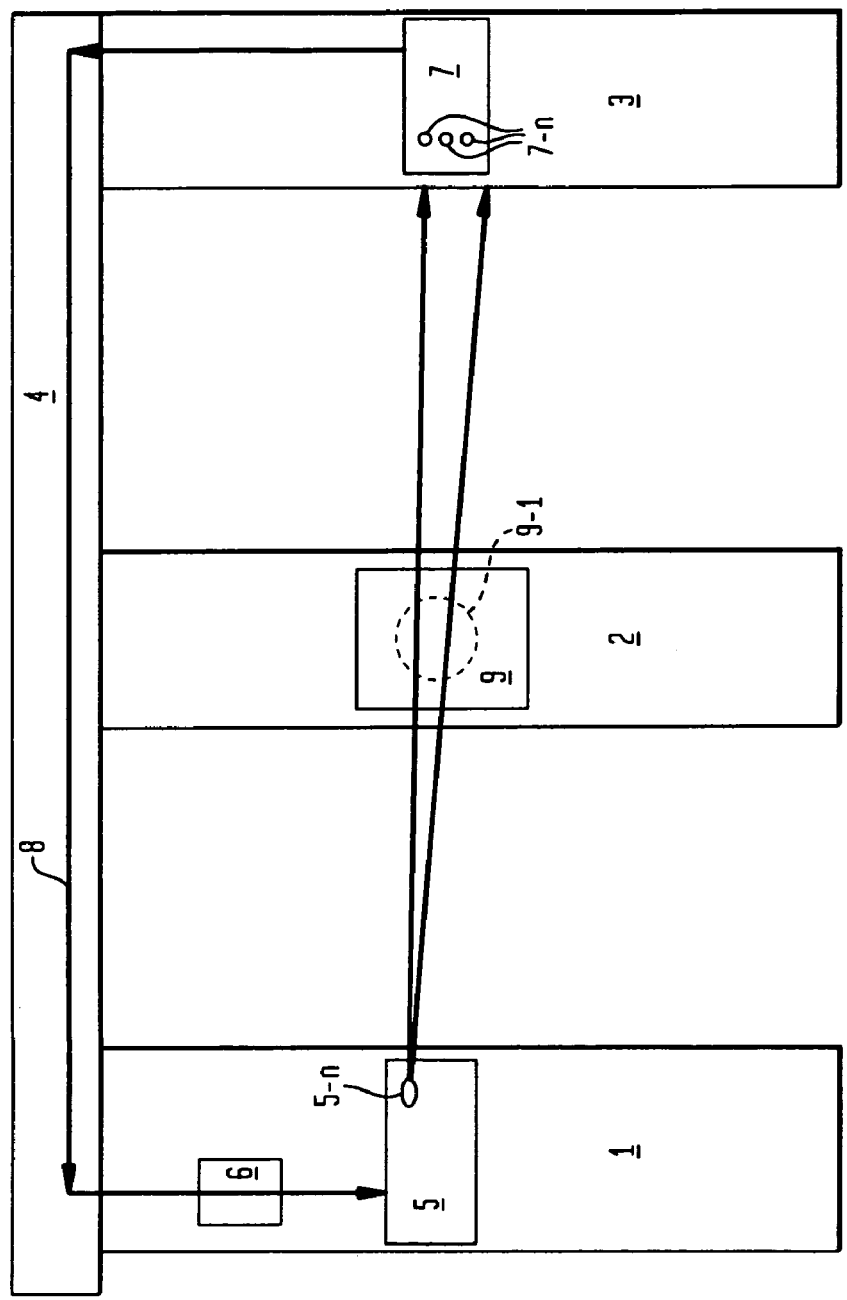

OPTICAL POWER

DRIVE VOLTAGE

PIN OUTPUT

CROSS PRODUCT

BIAS VOLTAGE

WDMA FREE SPACE BROADCAST TECHNIQUE FOR OPTICAL BACKPLANES AND INTERPLANAR COMMUNICATIONS

BACKGROUND OF THE INVENTION

1. Field of the Invention

The present invention relates generally to a Wavelength Division Multiple Access (WDMA) free space broadcast technique for optical backplanes and interplanar communications, and more particularly pertains to a WDMA free space broadcast arrangement for optical backplanes and interplanar communications for providing free space optical interconnects between multiple circuit cards in a computer system or networking device which is compatible with existing electrical backplanes. With the present invention, current equipment can easily be upgraded in the field to take advantage of this new approach by simply replacing existing printed circuit boards, without requiring a complete redesign of the copper backplane.

2. Discussion of the Prior Art

Electrical interconnects are emerging as a bottleneck in the performance of large enterprise servers and supercomputers, as well as in data communication networks for metropolitan areas (50–100 km).

Future requirements for bandwidth in the backplanes of computers, networking equipment, digital cross-connect switches, routers and multiplexers are expected to require on the order of 5–10 Tbit per second throughput. This can be most readily achieved by using some form of optical interconnect. Various schemes have been proposed, including routing optical fiber across an electrical backplane or by using polymer-type materials to fabricate surface waveguides for optical signals. However, the approaches suggested to date are typically very costly to implement and face complex technical problems with alignment of the optical fibers, light sources and receivers (which are typically present in large arrays).

The use of VCSEL (vertical cavity surface-emitting lasers) lasers has further complicated this problem because these laser sources, although low cost and highly reliable, emit light perpendicular to the substrate; this requires some form of optical surface connection in an array form to accommodate VCSEL laser arrays and receiver arrays. Furthermore, existing optical bus proposals have not been widely implemented because they require an extensive redesign of the equipment backplane to convey optical signals from one location to another.

There is a need for an optical interconnect technology which addresses the use of VSCEL area array connections, is compatible with existing legacy card/board manufacturing processes, and does not require a redesign of the entire backplane of the networking equipment in order to achieve a higher I/O bandwidth. If such a solution were widely available, it would solve a bottleneck problem in the MAN and enable new types of optical interconnect solutions.

The explanations herein discuss both wavelength and frequency, which have a reciprocal relationship ($\lambda = c/f$, where c=speed of light), as is well known in the field of optics.

Wavelength Division Multiplexing (WDM) and Dense Wavelength Division Multiplexing (DWDM) are light-wave application technologies that enable multiple wavelengths (colors of light) to be paralleled into the same optical fiber or through free space with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multilayer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

Ideally, a WDM laser would produce a very narrow linewidth spectrum consisting of only a single wavelength, and an ideal filter would have a square bandpass characteristic of about 0.4 nm width, for example, in the frequency domain. In practice, however, every laser has a finite spectral width, which is a Gaussian spread about 1 to 3 nm wide, for example, and all real filters have a Gaussian bandpass function. It is therefore desirable to align the laser center wavelength with the center of the filter passband to facilitate the reduction of crosstalk between wavelengths, since the spacing between WDM wavelengths are so narrow. In commercial systems used today, however, it is very difficult to perform this alignment—lasers and filters are made by different companies, and it is both difficult and expensive to craft precision tuned optical components. As a result, the systems in use today are far from optimal; optical losses in a WDM filter can be as high as 4 db due to misalignment with the laser center wavelength (the laser's optical power is lost if it cannot pass through the filter). This has a serious impact on optical link budgets and supported distances, especially since many filters must be cascaded together in series (up to 8 filters in current designs, possibly more in the future). If every filter was operating at its worst case condition (worst loss), it would not be possible to build a practical system. Furthermore, the laser center wavelengths drift with voltage, temperature, and aging over their lifetime, and the filter characteristics may also change with temperature and age. The laser center wavelength and filter bandwidth may also be polarization dependent. This problem places a fundamental limit on the design of future WDM networking systems.

A second, related problem results from the fact that direct current modulation of data onto a semiconductor laser diode causes two effects, which may induce rapid shifts in the center wavelength of the laser immediately after the onset of the laser pulse. These are (1) frequency chirp and (2) relaxation oscillations. Both effects are more pronounced at higher laser output powers and drive voltages, or at higher modulation bit rates. Not only can these effects cause laser center wavelengths to change rapidly and unpredictably, they also cause a broadening of the laser linewidth, which can be a source of loss when interacting with optical filters or may cause optical crosstalk. Avoiding these two effects requires either non-standard, expensive lasers, external modulators (which are lossy and add cost), or driving the laser at less than its maximum power capacity (which reduces the link budget and distance). Lowering the data modulation rate may also help, but is often not an option in multi-gigabit laser links.

It would thus be highly desirable to provide a stable, optimal alignment between a laser center wavelength and the center of a Gaussian bandpass filter in order to optimize power transmission through such fiber optic systems or through free space and reduce optical crosstalk interference in optical networks.

SUMMARY OF THE INVENTION

It is a primary object of the present invention to provide a WDMA free space broadcast technique and arrangement for optical backplanes and interplanar communications.

The present invention concerns an arrangement for providing free space optical interconnects between multiple circuit cards in a computer system or networking device which is compatible with existing electrical backplanes. With the present invention, current equipment can easily be upgraded in the field by simply replacing existing printed circuit boards, without requiring a complete redesign of the copper backplane.

The present invention concerns wavelength selective devices which encompass wavelength selective devices of all types including filters of all types including comb filters, etalon filters and rotatable disc filters and wavelength selective gratings of all types including Bragg gratings and array waveguide gratings.

It is an object of the present invention to provide a servo-control "wavelength-locked loop" circuit that enables real time mutual alignment of an electromagnetic signal having a peaked spectrum function including a center wavelength and a wavelength selective device implementing a peaked passband function including a center wavelength, in a system employing electromagnetic waves.

It is another object of the present invention to provide a servo-control system and methodology for WDM and DWDM systems and applications that is designed to optimize power through multi-gigabit laser/optic systems.

It is a further object of the present invention to provide a wavelength-locked loop for an optical system that enables real time alignment and tracking of any spectral device that selects a wavelength, such as a Bragg grating, in optical fibers and waveguides, etc., for use in WDM systems.

It is yet another object of the present invention to provide a servo/feedback loop for an optical system, referred to as a "wavelength-locked loop," that enables real time alignment of a laser with variable optical attenuators by offsetting an optical filter from a known transmission in optical fibers and waveguides, etc.

It is yet a further object of the present invention to provide a servo/feedback loop for an optical system, referred to as a "wavelength-locked loop," that may be used in light polarization applications.

It is still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that the optical loss of a WDM filter/laser combination is greatly reduced, thereby enabling significantly larger link budgets and longer supported distances.

It is yet still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that lower cost lasers and filters may be used providing a significant cost reduction in the WDM equipment.

When employed in laser/optical networks, the system and method of the present invention may be used to tune laser diode devices, and/or compensate for any type of wavelength-selective element in the network, including wavelength selective filters, attenuators, and switches, in fiber Bragg gratings, ring resonators in optical amplifiers, external modulators such as acousto-optic tunable filters, or array waveguide gratings. This applies to many other optical components in the network as well (for example, optical amplifiers that may act as filters when operating in the nonlinear regime). Furthermore, the system and method of the invention may be used to implement less expensive devices for all of the above application areas.

Alternately, the system and method of the invention may be implemented to tune such devices for WDM and optical network applications, in real-time, during manufacture, e.g., tuning all lasers to a specific wavelength. This would significantly increase lot yields of laser devices which otherwise may be discarded as not meeting wavelength specifications as a result of manufacture process variations, for example.

The wavelength locked loop of the present invention enables a tighter control of wavelength, which allows an increased density of wavelength channels with less cross talk between channels in a wavelength multiplex system, which might typically include 32 or 64 channels or links. Pursuant to the present invention, each channel includes a separate wavelength locked loop which includes a separate source such as a laser and wavelength selective device such as a filter. Accordingly a wavelength multiplex system can include an array of 32 or 64 lasers and an array of 32 or 64 filters.

BRIEF DESCRIPTION OF THE DRAWINGS

The foregoing objects and advantages of the present invention for a WDMA free space broadcast technique for optical backplanes and interplanar communications may be more readily understood by one skilled in the art with reference being had to the following detailed description of several embodiments thereof, taken in conjunction with the accompanying drawings wherein like elements are designated by identical reference numerals throughout the several views, and in which:

FIG. 1(b) illustrates an alternate embodiment which transmits data through one or more intermediate circuit cards by the use of apertures therethrough.

DETAILED DESCRIPTION OF THE DRAWINGS

The present invention concerns an arrangement for providing free space optical interconnects between multiple circuit cards in a computer system or networking device which is compatible with existing electrical backplanes. With the present invention, current equipment can easily be upgraded in the field by simply replacing existing printed circuit boards, without requiring a complete redesign of the copper backplane.

The approach of the present invention takes advantage of the vertical emission of low cost VCSEL sources and semiconductor optical receivers in a multilayer laminated structure. The requirement for alignment between transmitter sources and receivers is addressed by using a large diameter optical beam of tunable wavelength from either a single laser source or multiple laser sources to simultaneously broadcast a signal or signals to multiple receiver elements; each receiver is tuned to a specific optical wavelength as required to receive a desired transmitted signal. For example, this can be accomplished in a 2-dimensional area array or by a matrix of sources and detectors.

The tuning of each receiver to a desired optical wavelength is accomplished by using a closed loop feedback control loop across the existing electrical backplane. A portion of the receiver electrical output signal is fed back at a relatively low data rate (kHz) across the existing electrical backplane to the light source; this forms a wavelength-locked feedback loop which can be used to tune the laser output wavelength or to tune the frequency of a tunable optical filter. Only those receiver elements which are tuned or wavelength-locked to the source wavelength will receive the desired signal. This method is designated wavelength division multiple access or WDMA. This approach takes advantage of high bandwidth optical interconnects to transmit data between circuit cards or elements in the network, while using the electrical backplane to carry only low data rate feedback control signals.

It can be shown that the resulting state machine is stable and rapidly tunable to any number of possible wavelengths, enabling reconfigurable, scalable or programmable communications between multiple circuit board elements. The resulting electo-optic printed circuit board (EOPCB) solves optical alignment problems and enables a low cost solution which can be upgraded from existing equipment. This approach is scalable to many interconnect levels.

An alternate embodiment of the present invention can use tunable optical filters with the receivers and fixed wavelength light sources.

Figure 1A:
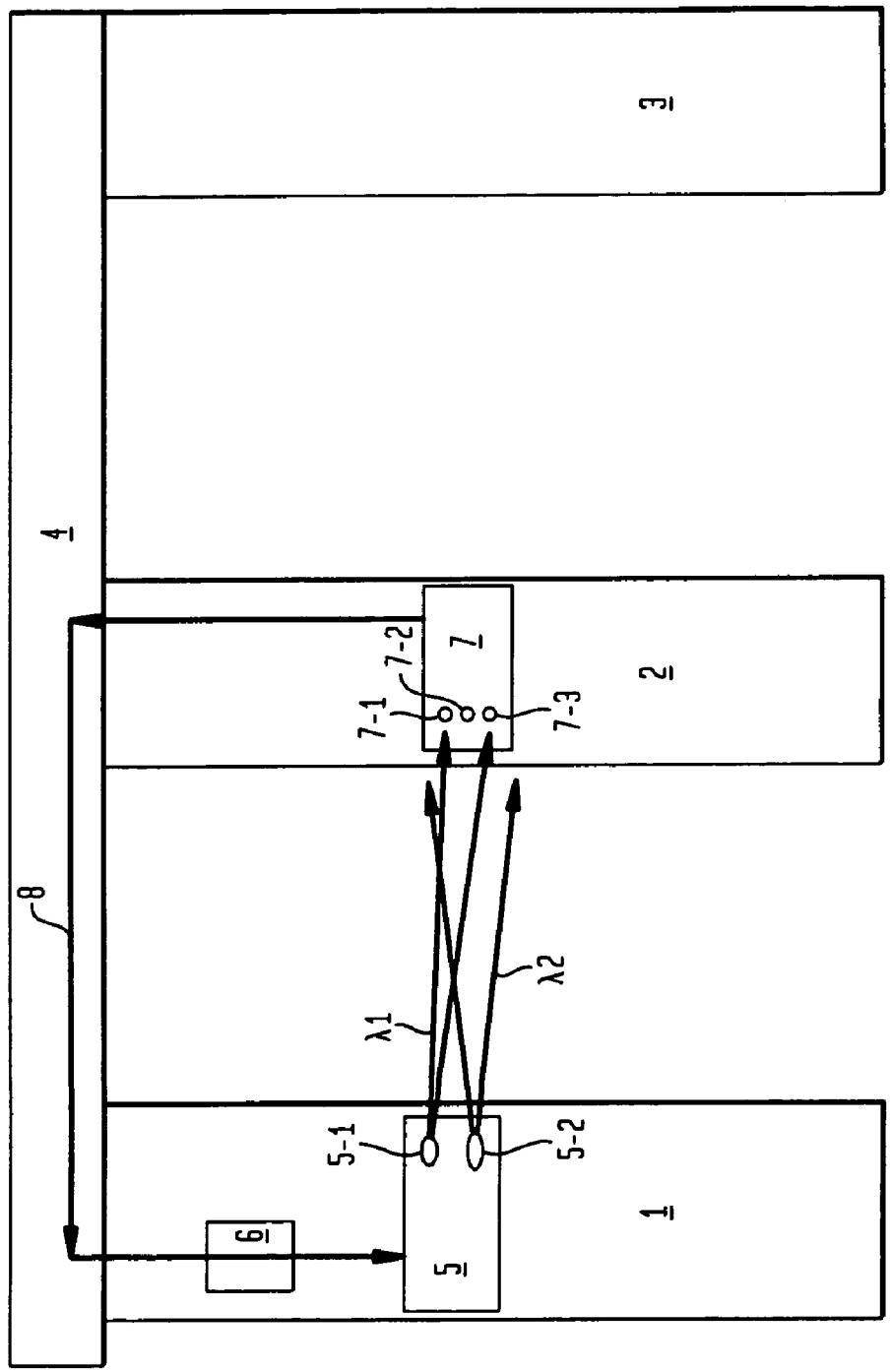
FIG. 1(a) shows a two dimensional (2D) optical interconnect between first and second circuit cards which are plugged into a common backplane.

FIG. 1(a) shows an optical free space board to board interconnect in an arrangement having first, second and third circuit cards 1, 2 and 3 which are plugged into a common backplane (EOPCB) 4, wherein a two dimensional (2D) optical interconnect is established between circuit cards 1 and 2. For illustrative purposes, two laser elements 5-1, 5-2 are shown of a two dimensional (2D) array 5 of vertical cavity surface-emitting lasers (VCSEL), which are controlled by a control chip 6. The two laser elements 5-1, 5-2 are shown broadcasting at two different optical wavelengths $\lambda 1$, $\lambda 2$ to multiple receiver elements of a two dimensional (2D) optical receiver array 7, with an electrical feedback path 8, operating in the kKz range through the electrical backplane 4, being shown for clarity; in reality, many more laser elements, receiver elements and electrical feedback paths would typically be accommodated at the same time.

This arrangement enables parallel optical bus technology and also permits the same source to talk with multiple receivers at the same time if desired. The I/O bandwidth is thus scalable to very large values. The optical signals can be at a very high data rate, typically in the GHz range.

It is preferred that the VCSEL source 20 has a sufficiently high laser beam coherence length such that each laser element 5-n in the VCSEL array 5 can broadcast its wavelength of light to cover and be received by the entire optical receiver array 7. Each laser element 5-n in the VCSEL array 5 can be tuned to a different optical wavelength, for example by varying its bias voltage or by using an external cavity tuning device, such as a microelectromechanical system (MEMS), or an electroabsorption laser (EAL).

The VCSEL beam divergence is sufficient to allow the beam to address multielement receiver arrays over typical circuit card separation distances (on the order of inches); longer distances can be accommodated in different embodiments by the use of microlenses or other auxiliary imaging optics. Each VCSEL laser element 5-n illuminates multiple receiver elements 7-1, 7-2, 7-3 in the receiver array 7, as shown in FIG. 1.

Each receiver element in this embodiment can incorporate a passive optical wavelength filter, such that the laser elements 5-2 of the VCSEL array 5 can be tuned to either match the filter and transmit data or to mismatch the filter and inhibit data transmission. Each receiver element has its own electrical feedback path across the backplane 4 to the control chip 6. The control chip 6 can be programmed to address individual laser elements 5-n in the VCSEL array, and to control and adjust their wavelengths (and intensity) accordingly. This approach implements a wavelength-locked servocontroller which can quickly tune the source wavelength to match a desired detector element. The composite system with multiple laser transmitter sources and multiple receivers comprise a wavelength division multiple access (WDMA) system.

FIG. 1(b) illustrates an alternate embodiment of the present invention wherein a circuit card 1 transmits data to a circuit card 3 through one or more intermediate circuit cards 2 through apertures 9 therein, which could also incorporate relay optics 9-1 in some embodiments. The data path may or may not require relay optics 9-1, depending on the card spacing and source/receiver angular divergence of a particular design. Micro-optic lenses can be fabricated using standard photolithographic patterning and etching techniques with thermal reflow of a polymer to facilitate this approach. This approach does not require optical components such as crossed polarizers or polarization rotators or isolators as suggested in prior art conventional designs.

The present invention uses an electrical feedback path through the backplane (EOPCB) to tune and lock the wavelength of each laser source 18 to the wavelength of a desired receiver, or alternatively to tune a tunable filter at a receiver to the wavelength of a laser source; multiple laser sources 18 can illuminate multiple receivers, alleviating an alignment problem and removing optomechanical assembly and test problems, and also costs associated with interfacing large arrays of optical fibers with the sources and receivers.

The present invention provides a novel servo-control system implemented for optical systems including light sources, such as lasers, and frequency selective devices, such as bandpass filters. The servo-control system, herein referred to as the "wavelength-locked loop" or "lambda-locked loop" (since the symbol lambda is commonly used to denote wavelength), implements a dither modulation to continuously adjust an electromagnetic signal source characterized as having a peaked frequency spectrum or peaked center wavelength, e.g., laser light, so as to track the center of a frequency selective device, e.g. a filter passband. In this manner, optimal power of the signal is transmitted and optimal use is made of the system transmission bandwidth.

The present invention provides a laser whose output wavelength can be tuned over a range of wavelengths. If the laser tuning is fast enough, data can be modulated onto the laser light. Even the ability to slowly tune a laser over 2–4 different wavelengths has benefits, including simplified implementation of coarse WDM systems for data communications channels such as Gigabit Ethernet. Tunability can take many alternate embodiments; for example, the bias voltage of a laser diode could be controlled, or alternatively a MEM could be integrated with a thin coating of an organic material such as Parylene, which is electrically birefringent, to produce a switch that is both mechanical and polarization sensitive, or by an electroabsorption laser (EAL).

Figure 1C:
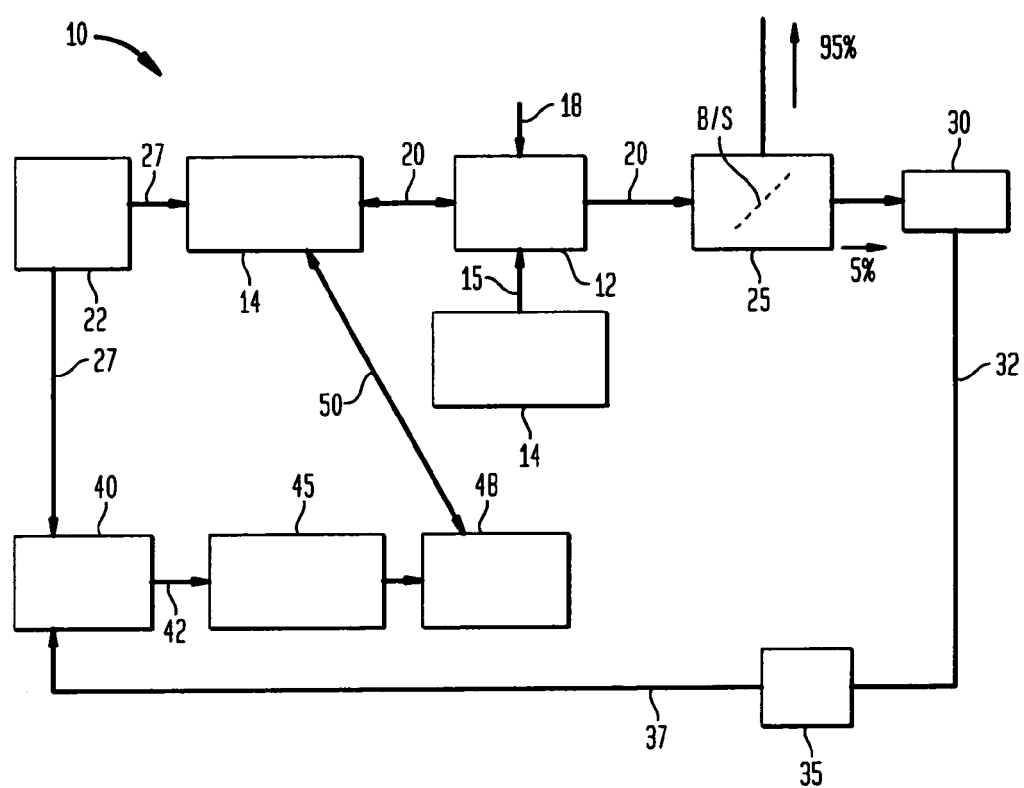
FIG. 1(c) illustrates a wavelength tunable laser diode in a dither wavelength locked feedback loop.
Figure 2A:
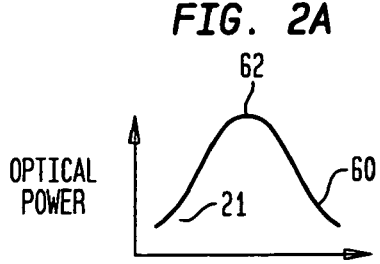
FIGS. 2(a)–2(c) are signal waveform diagrams depicting the relationship between laser optical power as a function of wavelength for three instances of optic laser signals.
Figure 2B:
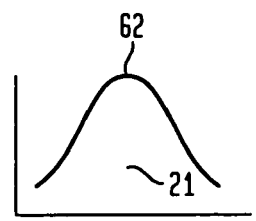
Figure 2C:
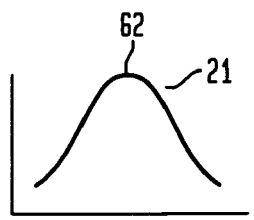
Figure 3A:
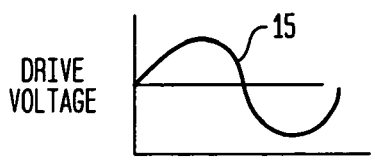
FIGS. 3(a)–3(c) are signal waveform diagrams depicting the laser diode drive voltage dither modulation (a sinusoid) for each of the three waveform diagrams of FIGS. 2(a)–2(c)
Figure 3B:
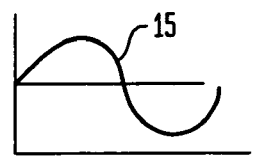
Figure 3C:
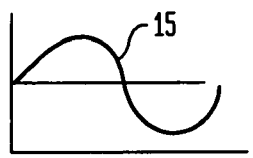

Referring to FIG. 1(c), the wavelength of a laser diode 12 oscillates at a dither frequency about a nominal laser wavelength. The emerging light beam 20 travels through one or more optical bandpass filters 25, and a small fraction of it (1–5%) is diverted by a beam splitter B/S to a pin photodiode 30. The bandpass filter(s) 25 may be realized with various technologies, including thin film interference filters and array waveguide gratings.

The photodiode 30 output current is proportional to the dither modulation of the light intensity which is produced after the dithered optical wavelength has passed through the bandpass filter(s) 25. The photodiode output 32 is amplified by an amplifier 35 and is then mixed with the original dither signal in a multiplier 40 to produce a vector cross product signal 42. The output 42 of the multiplier is then filtered at 45 to pass the vector cross product, which is then integrated, and preferably digitized, at 48 to produce a feedback signal 50 that indicates to the laser wavelength control 14 whether the laser center wavelength is aligned with the filter center wavelength, and if not in what direction and by what amount the wavelength must be shifted or changed to be brought into alignment with the center wavelength of the bandpass filter(s) 25.

Technically, the multiplication with the original dither signal is used to detect the relative phase of the signal, which is determined by the local slope of the wavelength passband; feedback through an integrator can then follow the slope to the peak of the passband. This feedback signal is an important element of the present invention as it enables a digital logic control circuit to shift or change the laser wavelength, bringing it into closer alignment with the center wavelength of the filter passband. Since this is an active feedback process, it can be used to correct for changes in the laser or filter properties such as those caused by ageing or temperature changes.

The feedback loop is stable for a wide range of conditions, and may be implemented as a variant on an externally excited adaptive loop design familiar from control systems theory. Note that the feedback loop acts as a high level state machine, compensating for all of the internal variables (wavelength selectivity) of the laser diode, filter, and other components with a single mechanism that stabilizes the laser and locks the wavelength to any desired value.

Further, the laser can easily be tuned in wavelength to another desired wavelength by this feature. It is estimated that a tuning range of 5 to 20 nm is achievable using current technology.

The wavelength-locked loop (WLL) is now described in further detail with reference to FIGS. 1(c) and 2–9. The basic operating principle of the wavelength-locked loop (WL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

FIG. 1(c) depicts an exemplary optical system 10 including a light source such as laser diode 12 driven with both a bias voltage 15 from a voltage bias circuit 14 and modulated data 18 from a data source (not shown). The laser diode generates an optical (laser light) signal 20 that is received by a bandpass filter 25, or any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass.

As further shown in FIG. 1(c), according to the invention, there is an added sinusoidal dither modulation circuit or oscillator 22 for generating a sinusoidal dither modulation that modulates the wavelength control bias voltage 14. The sinusoidal dither signal varies the laser wavelength. The dither modulation frequency is on the order of a few kilohertz (kHz) but may range to the Megahertz range. Preferably, the dither modulation frequency is much less than the data rate which is typically on the order of 1–10 GHz. Modulation of the wavelength control in this manner causes a corresponding dither in the laser center wavelength. Modulated data is then imposed on the laser, and the optical output passes through the bandpass filter 25. Preferably, the filter 25 is designed (e.g. with a beam splitter B/S) to tap off a small amount of light, for example, which is incident upon a photo detector receiver device, e.g., PIN diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 27. The cross product signal 42 that results from the multiplication of the amplified PIN diode output (feedback signal) 37 and the dither signal 27 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the wavelength control 14. In this manner, the laser wavelength will increase or decrease until it exactly matches the center of the filter passband. Alternately, the error signal 50 may be first converted to a digital form prior to input to the wavelength control 14.

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in the embodiment depicted in FIG. 8, there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 7:
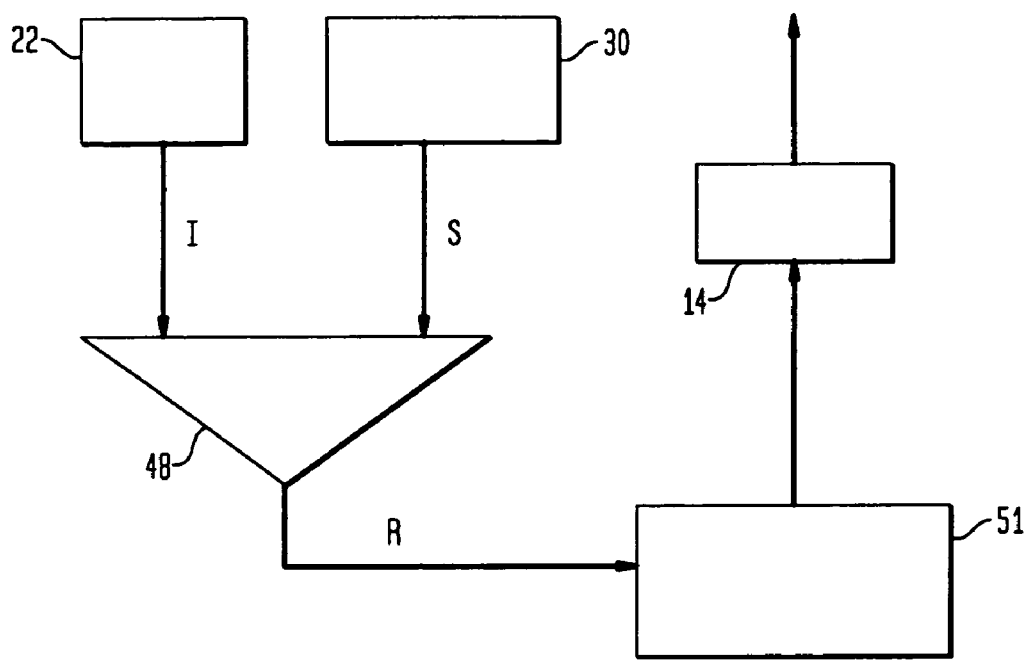
FIG. 7 is a generalized circuit diagram depicting how dithering is implemented in the WLL system of the present invention.

A generalized description of how dithering is implemented for providing a WLL in the present invention is now provided in view of FIG. 7. As shown in FIG. 7, the sinusoidal dither generator (harmonic oscillator) 22 produces a dither signal 27, I which causes the laser center wavelength to oscillate with a small amplitude about its nominal position. After passing thru the optical bandpass filter, the laser wavelength variation is converted into intensity variation which is detected by the photodetector circuit 30 (e.g., photodiode). The servo loop feeds back the photodiode output signal, S, and takes a vector cross product with the original sinusoidal dither, I. The cross product result is averaged (integrated) over a time period T and may be sampled and digitized to produce the equivalent of an error detect signal, R, which is bipolar and proportional to the amount by which the laser center wavelength and filter center wavelength are misaligned. Optionally, the signals may be normalized to account for variations in the laser power output from the filter. Optionally, an external tuning circuit may be implemented to receive the error signal and enable the laser center wavelength offset to vary to an arbitrary value. Finally, the error signal R is fed back used by the wavelength control 14 to adjust the laser center wavelength in the proper direction to better align with the filter center wavelength.

The operating principle is further illustrated in the timing and signal diagrams of FIGS. 2–6. FIGS. 2(a)–2(c) particularly depict the relationship between laser optical power as a function of wavelength for three instances of optic laser signals: a first instance (FIG. 2(a)) where the laser signal frequency center point 21 is less than the bandpass function centerpoint as indicated by the filter bandpass function 60 having centerpoint 62 as shown superimposed in the figures; a second instance (FIG. 2(b)) where the laser frequency center point 21 is aligned with the bandpass function centerpoint 62; and, a third instance (FIG. 2(c)) where the laser frequency center point 21 is greater than the bandpass function centerpoint 62. In each instance, as depicted in corresponding FIGS. 3(a)–3(c), the drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 2(a) and 2(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 4(a) and 4(c). It is noted that for the laser signals at frequencies below the peak (FIG. 2(a)) the feedback error signal 32 corresponds in frequency and phase to the dither signal (FIG. 4(a)), however for the laser signals at frequencies above the peak (FIG. 2(c)) the feedback error signal 32 corresponds in frequency but is 180° opposite phase of the dither signal (FIG. 4(c)). Due to the bipolar nature of the feedback signal (error signal) for cases when the laser signal centerpoint is misaligned with the bandpass filter centerpoint, it is thus known in what direction to drive the laser (magnitude and direction), which phenomena may be exploited in many different applications. For the laser signal depicted in FIG. 2(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 4(b) showing a feedback error signal at twice the frequency of the dither frequency.

Figure 4A:
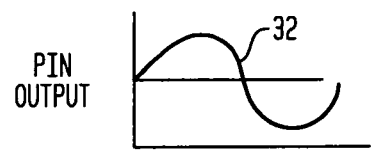
FIGS. 4(a)–4(c) are signal waveform diagrams depicting the resulting feedback error signal output of the PIN diode for each of the three waveform diagrams of FIGS. 2(a)–2(c)
Figure 4B:
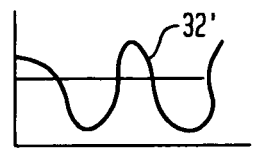
Figure 4C:
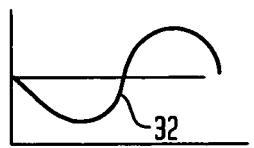

Thus, in each instance, as depicted in corresponding FIG. 4(b), the resulting feedback signal exhibits frequency doubling if the laser center wavelength is aligned with the filter center wavelength; otherwise it generates a signal with the same dither frequency, which is either in phase (FIG. 4(a)) or out of phase (FIG. 4(c)) with the original dither modulation. It should be understood that, for the case where the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Figure 5A:
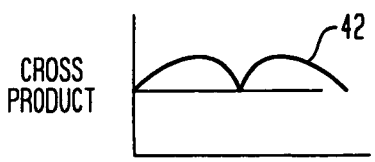
FIGS. 5(a)–5(c) are signal waveform diagrams depicting the cross product signal resulting from the mixing of the amplified feedback error with the original dither sinusoid.
Figure 5B:
Figure 5C:
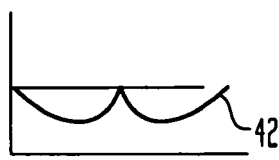
Figure 6A:
FIGS. 6(a)–6(c) are signal waveform diagrams depicting the rectified output laser bias voltage signals which are fed back to adjust the laser current and center frequency.
Figure 6B:
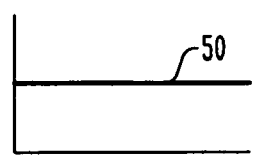
Figure 6C:
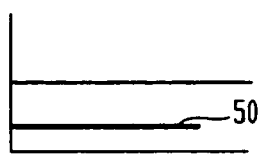

Thus, referring now to FIGS. 5(a) and 5(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 5(a) or, at a second polarity (for the laser signals at frequencies above the bandpass filter centerpoint), such as shown in FIG. 5(c). Each of these signals may be rectified and converted into a digital output laser bias voltage signal 50 as shown in respective FIGS. 6(a) and 6(c), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 6(b)) which will maintain the laser frequency centerpoint at its current wavelength value.

In order to describe further benefits of the invention, it is first noted that although it may appear that if a filter bandpass is larger than the laser linewidth, then the entire optical pulse will pass through the filter unaffected. However, this is clearly not the case; the laser spectra and filter function are both Gaussian, in both time and wavelength (reciprocal of frequency). Thus, passing the laser spectra through the filter results in a convolution between the spectrum and filter functions. Implementing analog signal processing, an output optical spectrum is produced which is actually narrower than the input spectra (i.e., some of the light is lost during filtering).

In a real WDM system there may be at least two (2) bandpass filter devices in a link to perform multiplex/demux functions at either end: in practice, there may be many bandpass filters configured in series. This leads to a secondary problem: when two filters are in series and their bandpass centers are not aligned, the original signal must be convolved with both filter functions; this narrows the signal spectra even further, at the cost of lowering the optical power by discarding the edges of the light spectra. A succession of filters not aligned with each other can be shown to have the same characteristics as a single, much narrower, filter. This further reduces the margin for misalignment between the laser and multiple filters. For example, even if the ideal center to center, wavelength spacing of a WDM system is 0.8 nm, due to misalignment between the mux and demux filters this window may be reduced to approximately 0.4 nm or less. This would require extreme precision and stability for the laser wavelength, making for a very expensive laser transmitter. Thus, there are really two problems to be solved: (1) laser to filter alignment; and, (2) filter to filter alignment. Note that when signals propagate through a fiber optic network or through free space and traverse multiple filters the wavelength may shift due to these effects combined with temperature and environmental effects. It is a real, practical problem to keep an input wavelength the same throughout the network, so that network architectures such as ring mesh, wavelength reuse, and wavelength conversion may work properly, i.e., this is called frequency referencing.

The present invention addresses frequency referencing as it can handle both of these instances. For example, as shown in FIG. 8, there is depicted a general block diagram depicting the underlying system architecture employing the wavelength-locked loop technique in an optical system 10' employing a series connection of two bandpass filters 25a, 25b.

Figure 9:
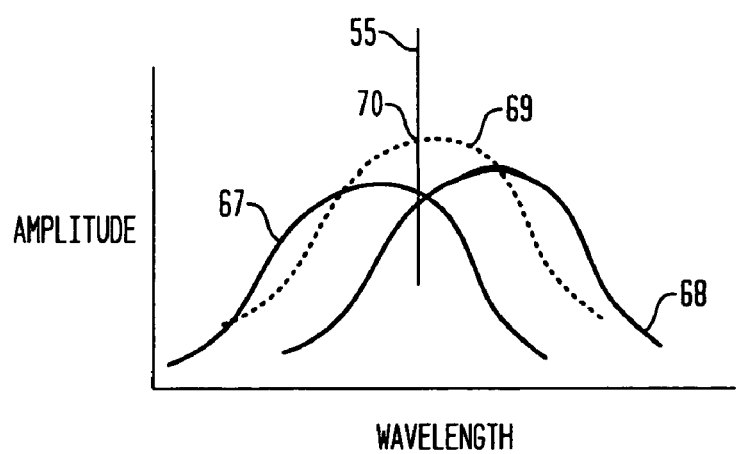
FIG. 9 is a signal waveform diagram depicting the relationship between laser optical power as a function of wavelength for the case of aligning a laser signal through a system including two bandpass filters in series, as depicted in FIG. 8.
Figure 8:
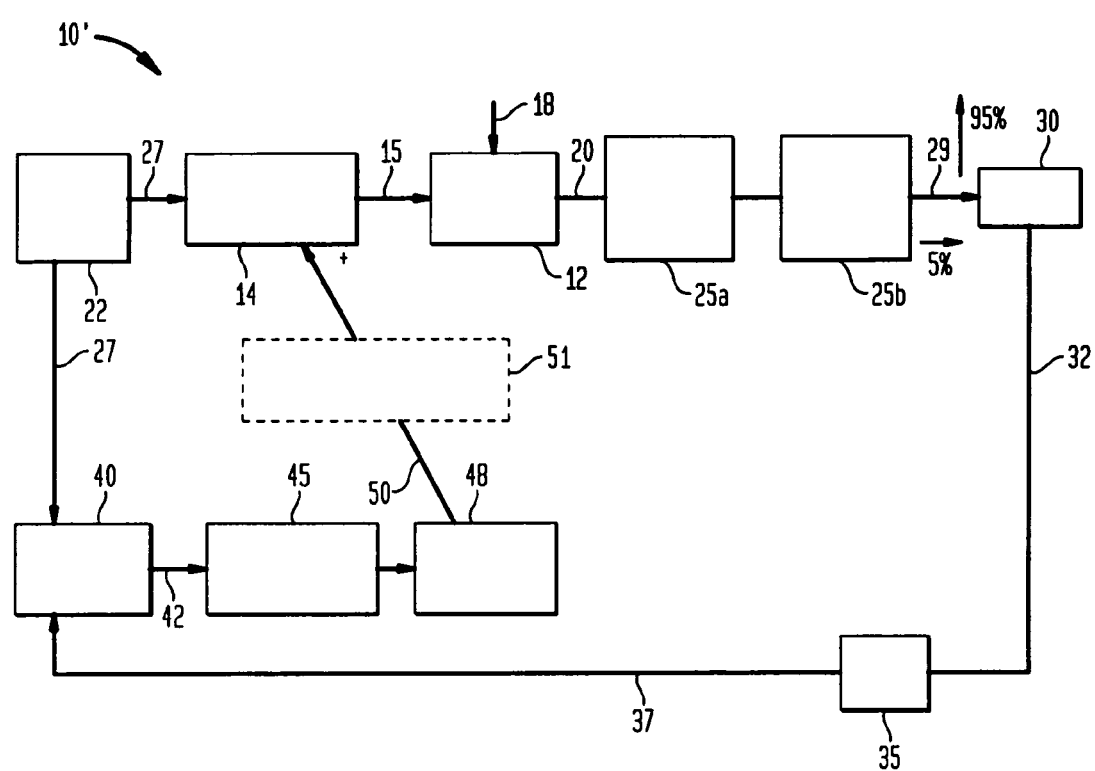
FIG. 8 is a general block diagram depicting the underlying system architecture for employing an optional wavelength shifter in the wavelength-locked loop technique, and also an optical system employing two bandpass filters according to the present invention.

FIG. 9 depicts each of the individual filter responses 67 and 68 for the two bandpass filters 25a, 25b of FIG. 8 and the corresponding composite filter response 69 having a centerpoint or peak 70. When performing filter to filter or multiple filter alignment, the technique of the invention depicted in FIG. 8 may be implemented to tune the laser signal to have a center frequency such that maximum power transfer will occur through the series connection of two bandpass filters as represented by its composite filter response 69 (FIG. 9). Generally, a cascade of bandpass filters results in an effective narrowing of the overall passband, as the net filter response is a convolution of the component filter responses. The WLL can align the laser center wavelength with the middle of this composite passband.

The system and method of the present invention may be used to tune a laser wavelength to compensate for any type of wavelength-selective element in a network, including wavelength selective switches, tunable filters, in fiber Bragg gratings, ring resonators in optical amplifiers, external modulators such as acousto-optic tunable filters, or array waveguide gratings. This applies to many other optical components in the network as well (for example, optical amplifiers that can act as filters when operating in the nonlinear regime). This method may additionally be used to implement less expensive devices for all of the above application areas. As the optical loss of a WDM filter/laser combination is greatly reduced by implementing the technique of the invention, significantly larger link budgets and longer distances may be supported. Further, the invention permits much lower cost lasers and filters to be used; since these are the most expensive parts of a WDM device today, there is a significant cost reduction in the WDM equipment.

While several embodiments and variations of the present invention are described in detail herein, it should be apparent that the disclosure and teachings of the present invention will suggest many alternative designs to those skilled in the art.

Having thus described our invention, what we claim as new and desire to secure by Letters Patent is:

1. An arrangement for providing free space optical interconnects between multiple circuit cards in a computer system or networking device, comprising:

the computer system or networking device comprising a plurality of circuit cards which are plugged into a common electrical backplane;

at least one of the plurality of circuit cards comprising a transmitter circuit card having at least one laser transmitter element producing a laser output signal and a controller to use a dither signal to modulate the wavelength of the laser output signal;

at least one of the plurality of circuit cards comprising a receiver circuit card having at least one receiver element, to establish at least one optical interconnect between the transmitter and receiver circuit cards;

a dither wavelength locked feedback loop for dynamically adjusting the optical interconnect to maintain the wavelength of the optical interconnect nominally centered at a desired wavelength, wherein a portion of the receiver electrical output signal is fed back across the common electrical backplane to the transmitter element to form a wavelength-locked feedback loop which is used to tune the wavelength of the optical interconnect, such that only those receiver elements which are tuned or wavelength-locked to the transmitter element wavelength receive the desired optical signal in a wavelength division multiple access (WDMA) system; and wherein the feedback loop mixes the feedback signal with the dither signal to produce a product signal, and uses said product signal to maintain the wavelength of the optical interconnect at the desired wavelength.

2. The arrangement of claim 1, wherein the transmitter circuit card includes an array of vertical cavity surface-emitting lasers.

3. The arrangement of claim 1, wherein the receiver circuit card includes an array of semiconductor optical receiver elements.

4. The arrangement of claim 1, wherein the receiver circuit card includes an array of semiconductor optical receiver elements.

5. The arrangement of claim 1, wherein the transmitter circuit card produces a large diameter optical beam of tunable wavelength from a single laser transmitter element to simultaneously broadcast a signal to multiple receiver elements, and each receiver element is tuned to a specific optical wavelength to receive a desired transmitted signal.

6. The arrangement of claim 1, wherein the transmitter circuit card produces a large diameter optical beam of tunable wavelength from multiple laser transmitter elements to simultaneously broadcast a signal to multiple elements, and each receiver element is tuned to a specific optical wavelength to receive a desired transmitted signal.

7. The arrangement of claim 1, wherein the feedback signal has a data rate in the KHz range which is lower than the laser output signal which has a data rate in the GHz range, such that the electrical backplane carries only low data rate feedback control signals.

8. The arrangement of claim 1, wherein the feedback control signals tune tunable laser transmitter elements.

9. The arrangement of claim 1, wherein the feedback control signals tune tunable optical filters in the receiver elements.

10. The arrangement of claim 1, wherein each laser transmitter element is tuned to a different optical wavelength by varying its bias voltage.

11. The arrangement of claim 1, wherein each laser transmitter element is tuned to a different optical wavelength by using an external cavity tuning device.

12. The arrangement of claim 1, wherein each laser transmitter element comprises an electroabsorption laser which is tuned to a different optical wavelength.

13. The arrangement of claim 1, wherein each receiver element incorporates a passive optical wavelength filter, and each laser element is tuned to either match the filter and transmit data or to mismatch the filter and inhibit data transmission.

14. An arrangement for providing free space optical interconnects between multiple circuit cards in a computer system or networking device, comprising:
the computer system or networking device comprising a plurality of circuit cards which are plugged into a common electrical backplane;
at least one of the plurality of circuit cards comprising a transmitter circuit card having at least one laser transmitter element producing a laser output signal;
at least one of the plurality of circuit cards comprising a receiver circuit card having at least one receiver element, to establish at least one optical interconnect between the transmitter and receiver circuit cards;
a dither wavelength locked feedback loop for dynamically adjusting the optical interconnect to maintain the wavelength of the optical interconnect nominally centered at the desired wavelength, wherein a portion of the receiver electrical output signal is fed back across the common electrical backplane to the transmitter element to form a wavelength-locked feedback loop which is used to tune the wavelength of the optical interconnect, such that only those receiver elements which are tuned or wavelength-locked to the transmitter element wavelength receive the desired optical signal in a wavelength division multiple access (WDMA) system; and
wherein each receiver element has its own electrical feedback path across the electrical backplane to a control chip which is programmed to address individual laser elements.

15. The arrangement of claim 1, wherein the transmitter circuit card transmits data to the receiver circuit card through one or more intermediate circuit cards through apertures in the one or more intermediate circuit cards.

16. The arrangement of claim 1, wherein the transmitter card transmits data to the receiver through one or more intermediate circuit cards through relay optics in the one or more intermediate circuit cards.

17. The arrangement of claim 1, in a wavelength division multiplexing communication system having a plurality of different communication channels carrying a plurality of different laser wavelength signals, wherein each communication channel includes a separate laser transmitter element and dither operated wavelength locked feedback loop.

18. The arrangement of claim 1, including:
a dither generator for generating a sinusoidal dither signal at a dither frequency which is applied to the laser transmitter element to produce a periodic change in the laser output wavelength which passes through a wavelength selective device;
a detector in the receiver element detects the laser output after the dithered laser output has passed through the wavelength selective device;
a mixer wherein the detector output is mixed with the dither signal to produce an output cross product feedback signal which indicates whether the laser wavelength is aligned with the center wavelength of the wavelength selective device, and if not in what direction and by what amount the wavelength of the laser must be shifted to be brought into alignment with the center wavelength of the wavelength selective device.

19. The arrangement of claim 18, wherein the dither generator generates the sinusoidal dither signal at a frequency of several kHz or less.

20. The arrangement of claim 18, further including:
a low-pass filter for filtering said cross-product signal; and
an integrator circuit for averaging said output cross-product signal to generate an error signal, wherein said error signal is positive or negative depending on whether a center wavelength of said laser output is respectively less than or greater than the desired wavelength of said wavelength selective device.

* * * * *